United States Patent

[11] 3,546,373

[72] Inventor Albert Macovski
Palo Alto, California

[21] Appl. No. 777,364

[22] Filed Nov. 20, 1968

[45] Patented Dec. 8, 1970

[73] Assignee RCA Corporation
a corporation of Delaware

[54] COLOR TELEVISION CAMERA OVERLOAD COMPENSATING SYSTEM
12 Claims, 6 Drawing Figs.

[52] U.S. Cl. .......... 178/5.4

[51] Int. Cl. .......... H04n 9/04

[50] Field of Search .......... 178/5.2, 5.4, 7.2(E); 315/(Inquired)

[56] References Cited

UNITED STATES PATENTS

| | | | |
|---|---|---|---|
| 2,969,424 | 1/1961 | Tait .......... | 178/5.4 |
| 2,978,537 | 4/1961 | Kruse, Jr. et al. .......... | 178/7.2(E) |
| 3,465,094 | 9/1969 | Biernson et al. .......... | 178/5.4 |

*Primary Examiner*—Richard Murray
*Attorney*—Eugene M. Whitacre

ABSTRACT: In a color-encoding camera in which intense light causes the luminance signal to become predominantly green, beam current is sampled and applied to a threshold circuit which disables the luminance signal channel during overload periods. In another embodiment the threshold signal is utilized as a color correction signal to maintain proper colorimetry during overload periods.

INVENTOR
ALBERT MACOVSKI
BY Eugene M. Whitacre
ATTORNEY

INVENTOR
ALBERT MACOVSKI
BY Eugene M. Whitacre
ATTORNEY

COLOR TELEVISION CAMERA OVERLOAD COMPENSATING SYSTEM

In color television systems employing a single camera tube such as illustrated in U.S. Pat. No. 2,733,291 granted to R. D. Kell on Jan. 31, 1956, and in U.S. Pat. No. 3,378,633 granted to A. Macovski on Apr. 16, 1968, a spatial color encoding filter is used to produce (1) a luminance signal covering a range of low and high frequencies and (2) two carrier waves of frequencies above the luminance signal range which are modulated respectively in amplitude to represent low frequency components of two of the three primary colors of the light derived from a colored subject. In normal operation, the two-color representative signals, after recovery from their respective carriers, are processed to produce two-color difference signals (e.g., R-Y and B-Y).

A camera tube, however, tends to overload (i.e., exhibit reduced sensitivity) at relatively high subject light levels in a manner which causes the amplitudes of the relatively high frequency color carrier waves to be reduced in amplitude disproportionately to the low frequency luminance signals. When the color representative signals are recovered from their respective carrier waves, their disproportionately reduced amplitudes are such that upon their combination with the low frequency luminance signals, erroneous color difference signals having negative values (e.g., representing > R or Y > B) are produced. Where the high subject light levels correspond to bright neutral areas of the subject, such areas are reproduced in the third primary subject color rather than in their true neutral tones.

An object of the present invention, therefore, is to provide an overload-compensating system for a color television camera which enables reproduction of an image in correct colors.

In accordance with the invention, use is made of the fact that the magnitude of output current at which the camera tube begins to overload is determined by the magnitude of the current in the electron beam which scans the photosensitive electrode of the tube. For values of light input up to a predetermined value where all of the beam current is needed to bring the charge on the photosensitive electrode to equilibrium, the output signal current versus the light input is a continuously increasing function. When the light input exceeds such predetermined value, the output current does not continue to increase appreciably with further light increase. Such are the conditions for the relatively low frequency luminance signals. The higher frequency color carrier waves are affected even more adversely, and actually decrease in amplitude as the light intensity of neutral areas of the subject increases above the predetermined value. Hence, a sample is taken of the beam current to develop a voltage which is used to establish a threshold for a device to which the low frequency components of the luminance signal are supplied. The output of the device is a correction signal determined by the amplitude of the low frequency components of the luminance signal for subject light levels in the region of camera tube overload. The correction signal is used to control compensating means by which to prevent the production of incorrect color difference signals of the two primary colors of the subject when the camera tube becomes overloaded in response to neutral highlights of the subject.

In one embodiment of the invention, the signal derived from the camera tube is separated by filters to produce the two separate color carriers and the low frequency components of the luminance signal. The correction signal derived from the threshold device is passed through an amplifier having a negative gain characteristic, the output of which is combined with the low frequency luminance signal derived from the camera tube to effectively produce a corrected low frequency luminance signal which then may be combined with the color representative signals to produce color difference signals which will be proper for the reproduction of correct neutral highlights of the subject irrespective of any overloading of the camera tube.

In another embodiment of the invention, the color representative signals recovered from the carrier waves are combined with the uncorrected low frequency components of the luminance signal and the low frequency components of the luminance signal are applied to the threshold device as in the first described embodiment to produce the correction signal. The color difference signals are applied to respective output terminals, with a pair of electronic switching devices connected ahead of the terminals for activation by the correction signal to effectively prevent the transmission to the terminals of any color difference signals produced when the subject light level exceeds that which overloads the camera tube.

For a more complete description of the invention, reference may be had to the following detailed description of two specific embodiments which is given in conjunction with the accompanying drawings, of which:

Figures 1, 2:
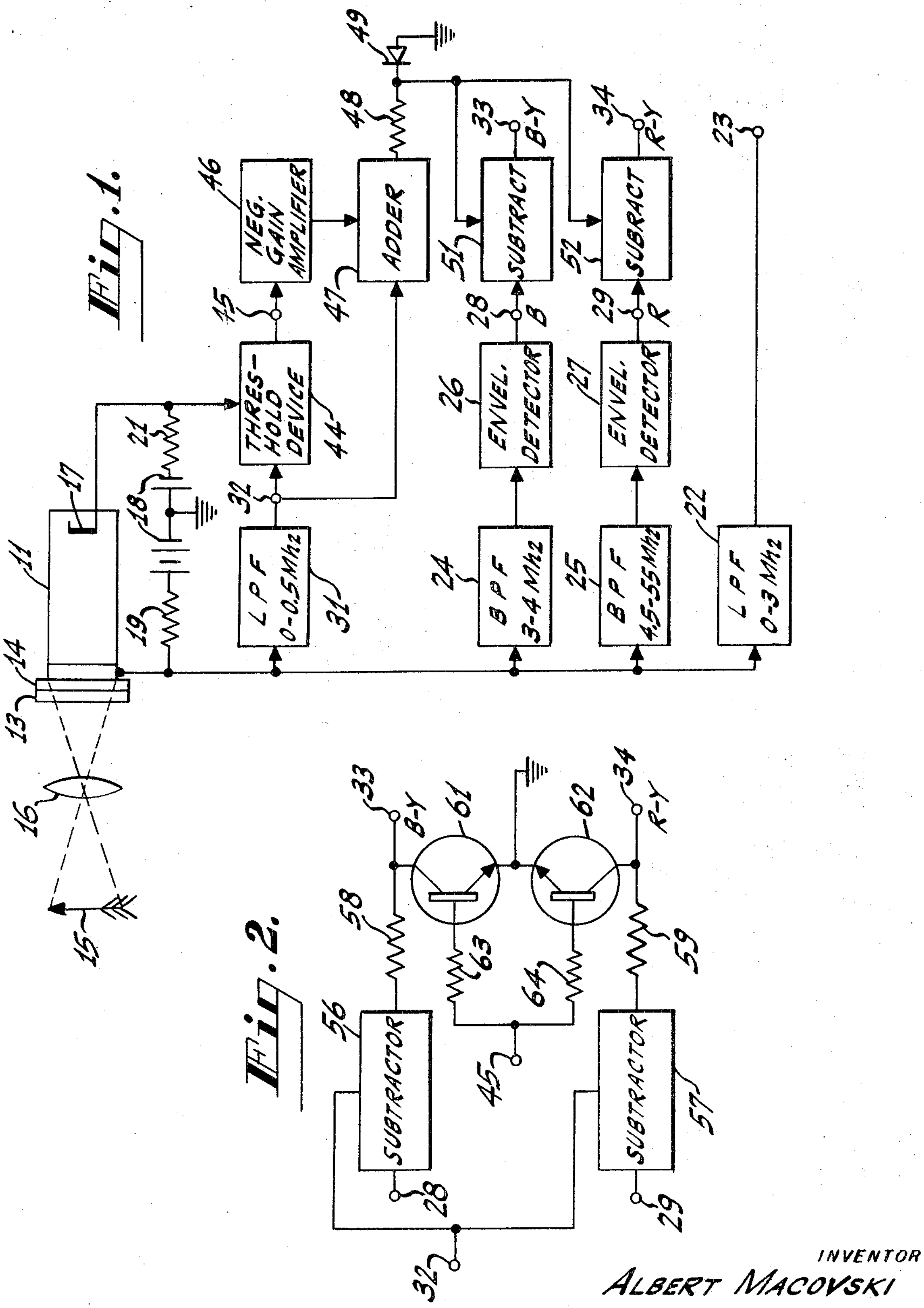
FIG. 1 is a block diagram of an embodiment of the invention in which a corrected luminance signal is used to produce the color difference signals when a camera tube becomes overloaded.
FIG. 2 is a block diagram of a modification of the system of FIG. 1 wherein the color difference signals, produced utilizing an uncorrected low frequency luminance signal, are prevented from reaching the output circuit means when a camera tube becomes overloaded.

In FIG. 1 a color television camera includes a pickup tube 11, such as a vidicon for example, having an internally formed photosensitive electrode 12 and a color filter grating structure 13 located either in direct contact with the faceplate 14 of the tube or optically arranged to transmit light from a colored subject 15 by suitable means including an optical system 16. The grating structure 13 may be similar to either of those disclosed in the Kell and Macovski patents previously referred to. The camera tube 11 also has an electron-emitting cathode 17 and the other necessary conventional electrode structure (not shown) for producing an electron beam by which to scan the photosensitive electrode 12 for the production of composite video signals comprising both luminance and color information. The camera tube 11 is energized by means including a grounded power supply 18 which is coupled to the photosensitive electrode 12 through an output load resistor 19 across which is developed the output composite video signals. Power supply 18 also is coupled to the cathode 17 through a resistor 21 across which there is developed a voltage proportional to the electron beam current.

The video signals produced across the output load resistor 19 are applied to a low pass filter 22 having an upper frequency cutoff at approximately 3 Mhz, in the present example, to produce a relatively low frequency wide band of Y, luminance, signals at an output terminal 23. Also, the output signals from the camera 11 are applied to band pass correction signal. 24 and 25 to separate two amplitude modulated relatively high frequency color carrier waves which are then individually applied to respective envelope detectors 26 and 27 to produce blue and red representative signals B and R at terminals 28 and 29. Another low pass filter 31 having an upper frequency cutoff at approximately 0.5 Mhz is coupled to the output load resistor 19 to produce a relatively narrow bandwidth low frequency luminance signal at a terminal 32.

The narrow bandwidth luminance signal conventionally would be combined with the color representative signals B and R present at terminals 28 and 29 to produce (B-Y) and (R-Y) color difference signals at terminals 33 and 34. Color difference signals thus produced may be incorrect for accurate reproduction of high intensity neutral areas of the subject if the camera tube becomes overloaded. Before describing the overload-compensating system of the invention, the reason for such malfunctioning will be better understood from a consideration of the curves of FIGS. 3, 4 and 5.

Figure 3:
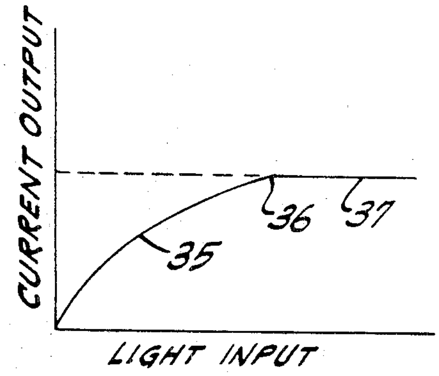
FIG. 3 depicts a typical light input versus current output transfer characteristic of a vidicon camera tube.

Based on the assumption that the camera tube 11 is of the vidicon type, FIG. 3 illustrates the manner in which current output varies as a function of light input. This vidicon response characteristic is substantially linear (portion 35) until the tube becomes overloaded (point 36), at which point further increases in the light input from the subject produces little, if any, appreciable increase in the output current. Thus, for light inputs greater than that represented by the point 36, the response characteristic is relatively flat (portion 37). The overload point 36 and, hence, the maximum useful output current, is proportional to the electron beam scanning current in the tube 11 of FIG. 1.

Figure 4:
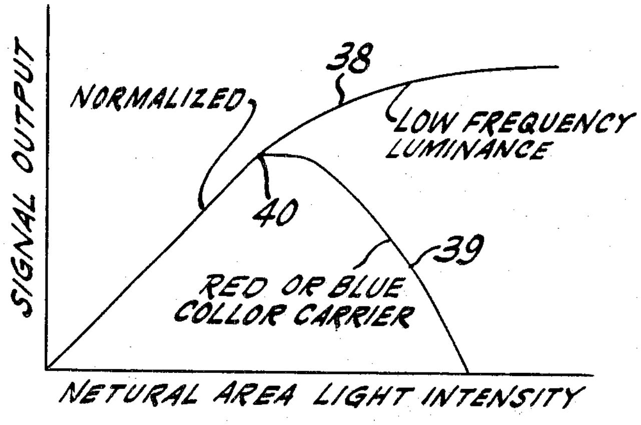
FIG. 4 is a group of curves showing the difference in response of a camera tube to the low frequency luminance signal output and the color carrier wave outputs when the camera tube becomes overloaded.

In FIG. 4 the curve 38 represents the variation of low frequency luminance signal output and the curve 39 represents the variation of one or the other color carrier signal wave output as a function of increasing light intensity as neutral areas of the subject are scanned. Curve 39 has been normalized with respect to curve 38 for ease of comparison. Each of these curves is substantially linear up to the point 40 at which the camera tube begins to overload. For still higher light intensities, the low frequency luminance signal output increases only slightly, but the higher frequency color carrier signal output decreases, thus resulting in a substantial disproportionality between the two signals.

Figure 5:
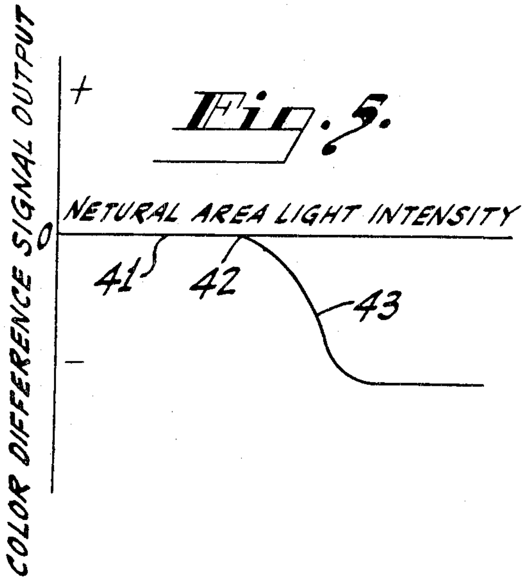
FIG. 5 illustrates the net result of the production of incorrect color difference signals in the absence of corrective measures such as those in accordance with the present invention when the camera tube becomes overloaded.

It is this disproportionality between the low frequency luminance signal and the higher frequency color carrier waves that would produce incorrect color difference signals as indicated in FIG. 5 in response to neutral area highlights of the subject when the camera tube becomes overloaded. As is well known, no color difference signals should be developed for neutral portions of the subject. Such a condition is indicated by the portion 41 of the curve of FIG. 5 up to the point 42 at which the light intensity of the subject begins to overload the camera tube. The declining portion 43 of this curve represents the production of incorrect color difference signals having negative values (e.g., Y>R) resulting from the decreased color carrier signal wave output as illustrated by the curve 39 of FIG. 4. Y >

The use of color difference signals such as represented by the curve of FIG. 5 for the reproduction of neutral areas of the subject results in the incorrect reproduction of such areas in the third primary color. For example, where the color carriers are modulated respectively by blue and red light representative signals, no net B-Y or R-Y color difference signal outputs should be developed to represent neutral subject areas and, in accordance with known matrixing and receiver signal-processing arrangements, the blue, red and green color representative signals will be produced in such relative proportions as to reproduce the desired colorless neutral areas of the subject. If, however, the B-Y and R-Y color difference signal outputs have negative values as indicated by the curve portion 43 of FIG. 5, the conventional system operates to develop a predominantly green color representative signal to erroneously reproduce neutral areas of the subject. Hence, in the assumed case of blue and red color difference signals, when such signals are developed at the (B-Y) and (R-Y) output terminals 33 and 34 of FIG. 1 having values such as represented by the curve portion 43 of FIG. 5, the neutral highlight areas of the reproduced picture will have the incorrect color of green.

In order to produce correct color difference signals at the output terminals 33 and 34 of FIG. 1 in accordance with the invention, the narrow bandwidth low frequency luminance signal developed at terminal 32 is applied to a signal threshold or gating device 44 having a threshold control. The black level of the luminance signal supplied to threshold device 44 is maintained at a fixed voltage. Threshold device 44 is an amplifier which amplifies the narrow bandwidth low frequency luminance signal developed at terminal 32 substantially linearly for all input signal levels exceeding a predetermined threshold. The threshold is determined by a biasing voltage applied to the device 44 from the electron beam current responsive resistor 21. No amplified narrow bandwidth low frequency luminance signal is produced at the output terminal 45 of the threshold device 44 until the biasing voltage is overcome. Any low frequency luminance signal produced at the terminal 45 is a correction signal which is applied to a negative gain amplifier 46. The output of amplifier 46 is coupled to an adder 47 which also is supplied with the narrow bandwidth low frequency luminance signal produced at terminal 32. The amplifier 46 and the adder 47 thus comprise a luminance signal combining means. The signal output from the adder 47 is clipped at substantially ground potential by a circuit which includes a series resistor 48 and a shunt connected diode 49 to produce a corrected narrow bandwidth low frequency luminance signal.

The corrected narrow bandwidth low frequency luminance signal derived from the clipping circuit 48, 49 is applied to two signal subtractors 51 and 52 for combination respectively with the blue and red representative signals B and R provided at terminals 28 and 29 to produce corrected (B-Y) and (R-Y) signals at the output terminals 33 and 34. Such color difference signals provide correct reproduction of the colored subject even though the camera tube 11 may become overloaded in response to neutral highlights of the subject. It will be understood that, until a signal is produced at the output terminal 45 of the threshold device 44, only the low frequency luminance signal provided at the output terminal 32 of the low pass filter 31 is applied to the adder 47 and it is this luminance signal which is combined in the subtractors 51 and 52 to produce proper (B-Y) and (R-Y) color difference signals at the terminals 33 and 34.

Figure 6:
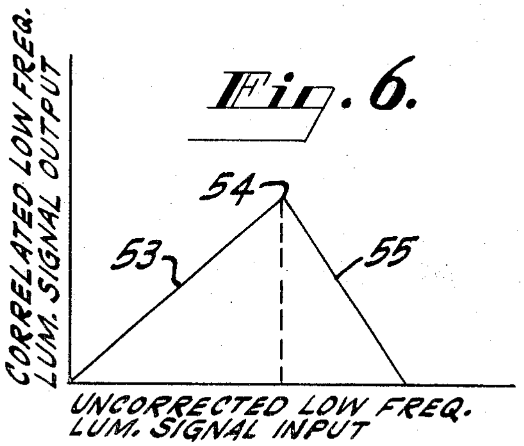
FIG. 6 graphically depicts the overall corrective characteristic in accordance with the invention as embodied in the apparatus of FIG. 1.

FIG. 6 illustrates graphically the manner in which the low frequency luminance signal is corrected by means of the described circuit apparatus of FIG. 1. The curve of FIG. 6, which is an overall characteristic of the apparatus, has an increasing substantially linear portion 53 up to the point 54 at which the camera tube 11 begins to overload. The decreasing portion 55 of the curve is produced by the combined operation of the negative gain amplifier 46 and the adder 47 of FIG. 1. This curve corresponds in shape generally to the color carrier curve 39 of FIG. 4. When the corrected low frequency luminance signal, as represented in FIG. 6, is combined in the subtractors 51 and 52, the (B-Y) and (R-Y) color difference signals produced at terminals 33 and 34 respectively will have no negative values such as shown by the curve portion 43 of FIG. 5 when high intensity light from neutral areas of the subject 15 overloads the camera tube 11. The slope of the decreasing portion 55 of the overall characteristic curve of FIG. 6 depends upon the negative gain factor of the amplifier 46 which may be adjusted so that this portion of the curve substantially matches the color carrier portion 39 of the curves of FIG. 4.

Another, and in some respects presently preferred, arrangement of a camera tube overload compensating system is shown in FIG. 2. This apparatus utilizes the signals present at terminals 28, 29, 32 and 45 of FIG. 1 to produce corrected (B-Y) and (R-Y) color difference signals respectively at terminals 33 and 34. The narrow bandwidth low frequency luminance signal at the output terminal 32 of the low pass filter 31 is applied to signal subtractors 56 and 57, to which also are respectively applied the blue and red light representative signals B and R produced at the output terminals 28 and 29 of the envelope detectors 16 and 17. Such an arrangement is the usual one for producing the (B-Y) and (R-Y) color difference signals. The color difference signals derived from the subtractors 56 and 57 are transmitted through respective resistors 58 and 59 to the (B-Y) and (R-Y) color difference signal output terminals 33 and 34 respectively.

The apparatus of FIG. 2 also includes electronic switching means including two transistors 61 and 62 having their respective collector-to-emitter circuits connected from the respective output terminals 33 and 34 to ground. The base electrodes of the transistors are connected respectively through resistors 63 and 64 to the output terminal 45 of the threshold device 44 of FIG. 1. As long as there is no overloading of the camera tube 11, there is no output from the threshold device 44 and, hence, no control voltage developed at the terminal 45. The collector-to-emitter electrode current paths of the switching transistors are normally nonconducting when there is no control voltage at terminal 45. When, however, the camera tube 11 begins to overload in response to high intensity light from the subject 15, the threshold device 44 produces a voltage at its output terminal 45 and the application of such a voltage to the base electrodes of the transistors 61 and 62 renders their respective collector-to-emitter electrode current paths conducting. Current conduction through these transistors effectively short circuits the transmission paths from the subtractors 56 and 57 to the respective color difference output terminals 33 and 34, thereby preventing the development of incorrect (B-Y) and (R-Y) color difference signals at the output terminals 33 and 34.

The nature of the invention, having been described in the foregoing disclosure of two illustrative embodiments thereof, its scope is defined in the following claims.

I claim:

1. In a color television system including a camera pickup tube for producing a luminance signal and two carrier waves of frequencies above the frequency range of said luminance signal modulated in amplitude to represent two of the three primary colors of light derived from a subject, said two color representative signals, when recovered from said carrier waves, being combined with said luminance signal to produce two color difference signals, said camera tube tending to overload at relatively high subject light levels, whereby the amplitudes of said color carrier waves are reduced disproportionately to the amplitude of said luminance signal resulting in the production of incorrect color difference signals and a consequent incorrect reproduction of the subject, an overload compensating system comprising:

means for producing a threshold signal representative of the subject light intensity at which said camera tube begins to overload;

signal-processing means responsive to said threshold signal to produce a correction signal determined by the amplitude of said luminance signal in the region of said camera overload; and compensating means responsive to said correction signal to prevent the production of incorrect color difference signals including said two primary colors when said camera tube becomes overloaded.

2. In a color television system, an overload compensating system as defined in claim 1, wherein said signal processing means comprises a gating circuit responsive to said threshold signal and to said luminance signal for producing correction signals representative of luminance signals occurring during camera tube overload condition.

3. In a color television system, an overload compensating system as defined in claim 2, wherein said compensating means comprises luminance signal combining means for combining said correction signal with said luminance signal derived from said camera tube to produce a corrected luminance signal for combination with said two-color representative signals to form correct color difference signals of said two primary colors.

4. In a color television system, an overload-compensating system as defined in claim 3, wherein:

said luminance signal combining means comprises an amplifier responsive to said correction signal and having a negative gain characteristic to produce a signal of opposite polarity to that of said correction signal; and an adder responsive to said opposite polarity signal and to said luminance signal derived from said camera tube to produce said corrected luminance signal.

5. In a color television system, an overload compensating system as defined in claim 4, wherein said compensating means also includes a signal clipper coupled to the output of said adder to clip said corrected luminance signal substantially at ground potential.

6. In a color television system, an overload compensating system as defined in claim 5, wherein said compensating means further includes color difference signal combining means responsive to said two color representative signals and to said corrected luminance signal derived from said clipper to produce two correct color difference signals.

7. In a color television system, an overload-compensating system as defined in claim 2, wherein:

said compensating means comprises color difference signal combining means coupled to output circuit means and responsive to said two-color representative signals and to said luminance signal derived from said camera tube to produce for transmission to said output circuit means two correct color difference signals at subject light levels below that at which said threshold signal voltage is produced; and switching means responsive to said correction signal derived from said signal processing means to effectively prevent the transmission of said two color difference signals from said color difference signal-combining means to said output circuit means when the subject light level is that at which said luminance signals exceed said threshold signal.

8. In a color television system, an overload compensating system as defined in claim 7, wherein said switching means is normally inoperative and is connected at a point between said color difference signal combining means and said output circuit means in a manner to reduce said color difference signals substantially to zero when rendered operative in response to said correction signal.

9. In a color television system, an overload compensating system as defined in claim 8, wherein:

said color difference signal-combining means comprise a color and luminance signal-combining device for each of said color difference signals coupled respectively to separate output terminals; and said switching means comprises a pair of electronic devices providing normally nonconducting current paths between said respective color and luminance signal combining devices and a reference voltage, and each having a control electrode responsive to said correction signal to render said respective current paths conducting.

10. In a color television system, an overload-compensating system as defined in claim 9, wherein each of said pair of electronic devices is a transistor having collector and emitter electrodes connected between said respective color and luminance signal combining devices and ground, and a base electrode coupled to said signal processing device to receive said correction signal.

11. In a color television system, an overload compensating system as defined in claim 1, wherein said means for producing a threshold signal comprises a source of beam current for said camera tube and circuit means responsive to said beam current for producing a threshold voltage.

12. In a color television system, an overload compensating system as defined in claim 11, wherein said signal processing means comprises a gating circuit responsive jointly to said threshold voltage and to said luminance signal for producing correction signals representative of luminance signals in excess of said threshold voltage.